Aug. 21, 1951     J. WARNER     2,565,010
COMBINED BATTERY FILLING CAP AND PLUG
Filed Dec. 19, 1950

JACOB WARNER,
INVENTOR.

BY
ATTORNEY.

Patented Aug. 21, 1951

2,565,010

UNITED STATES PATENT OFFICE 2,565,010

COMBINED BATTERY FILLING CAP AND PLUG

Jacob Warner, Los Angeles, Calif.

Application December 19, 1950, Serial No. 201,603

4 Claims. (Cl. 136—162)

This invention relates to a combined battery filling cap and plug.

It is not altogether new in the art to which the present invention pertains to provide means for visibly indicating the level of the electrolyte in a storage battery, or the level of the water in a container fixed to the battery and supplying water thereto. Yet it is new in the art, in so far as careful research has disclosed, to provide a cup which permits of supplying water to the battery and to a reservoir containing water for feeding the battery, which does not have to have a portion of its parts removed in refilling with the result that the electrolyte is apt to reach the hands and later the eyes or water replenishing source, thus injuring the eyes and contaminating said source.

With the present device applied to the storage batteries now used in automotive equipment, it is easy for the service station attendant, when he changes or inspects the oil supply, to glance at the storage battery and see if one or more of the cells of the battery need replenishing with water. In case that is necessary all that he has to do is to elevate the cover of the cup, together with the water conducting tube carried thereby, to a water flow restricting position, and then insert the rubber water supplying tube into the cup between its mouth and raised cover, fill the cup and then reapply the cover. By this procedure the battery is supplied with additional water, a new and improved mode of operation being involved; and this new mode of operation, combined with the new mode of assembling the parts of the device, results in the production of a new and improved article of manufacture.

The paramount object of the present invention is to produce a device, attachable to the filling necks of a battery and usable in such a manner as to prevent the electrolyte from coming into contact with human hands or with water supply apparatus during the filling of the battery with the required amount of water, and/or the cup to replenish the supply therein as it becomes exhausted.

Additional objects are to provide a device of the above stated kind more accessible for replenishing the water in individual cups and in supplying the water to separate cells independently without complete removal of any part; to provide a combined cup and plug which does not have to be removed for filling when the cup becomes empty or the electrolyte in the cell becomes low; to provide a visible water supply in conjunction with cooperating improved features, and to secure the aforesaid improved results without complicating the structure of the device.

Other objects, advantages and features of invention will hereinafter appear.

Referring to the accompanying drawing, which illustrates a preferred embodiment of the invention, Fig. 1 is a view partly in side elevation and partly in vertical section, illustrating two cells of the usual three cell battery, each of said two cells being equipped with my newly invented device, one of said devices being shown in its operative or water supplying position and the other with its lid open for refilling.

Figure 1:
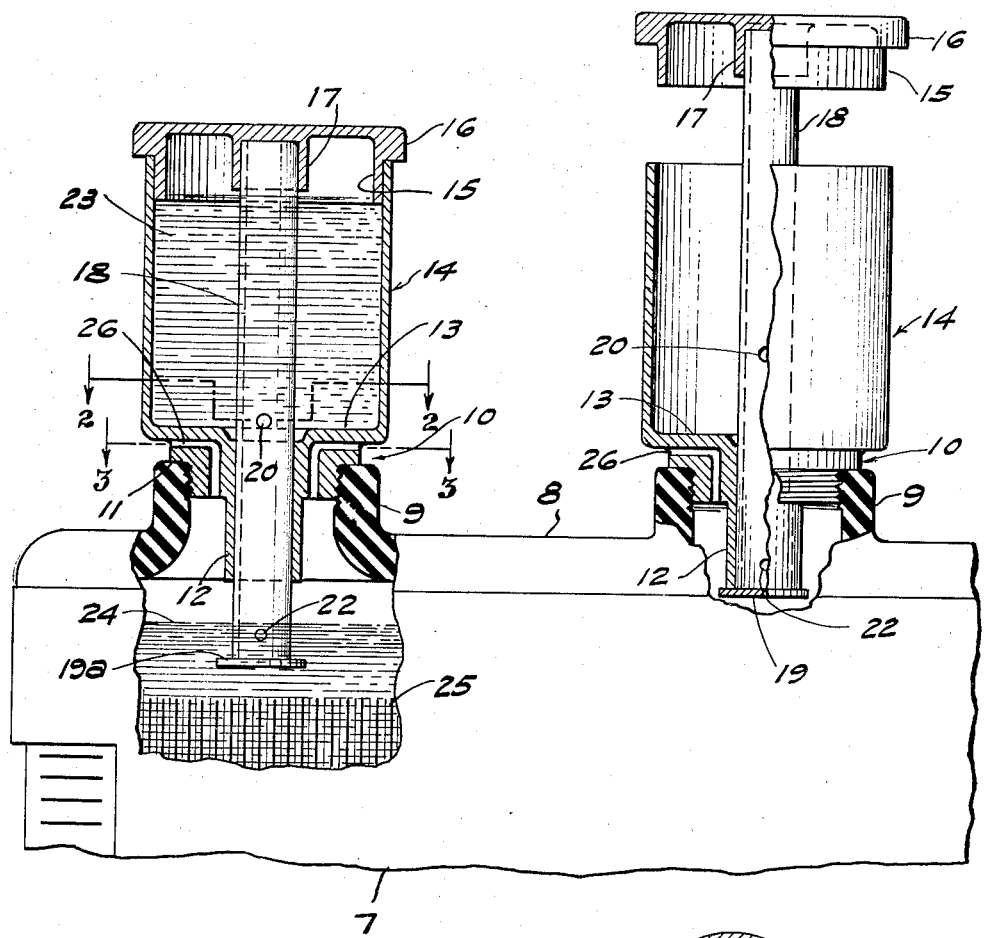
Figure 2:
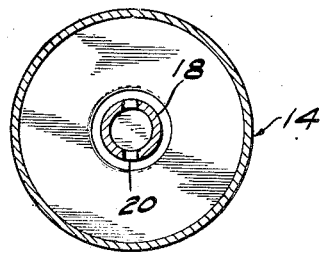
Fig. 2 is a horizontal section on line 2—2 of Fig. 1.
Figure 3:
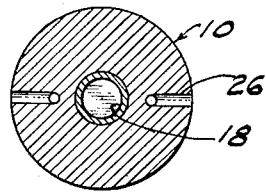
Fig. 3 is a horizontal section on line 3—3 of Fig. 1.

Referring in detail to the drawing, the storage battery casing 7 is shown having a cover 8 provided with a plurality of upstanding filler necks 9. Each of said necks is internally screwthreaded to have screwed into it an externally screwthreaded annular plug 10 having around its upper end a flange 11 which abuts the upper end of the filler neck when the plug is screwed down. Said plug also carries integrally a depending cylindrical spout 12 the internal diameter of which coincides with the internal diameter of the plug.

Said annular plug 10 is shown as an integral part of the bottom 13 of a cylindrical cup 14 into the upper end of which is closely but slidably fitted the depending peripheral flange 15 of a closure cap 16. Said cap, in turn, is provided integrally with a depending annular central flange 17 within which is fitted in a friction tight manner the upper end portion of a tube 18 which extends down through and is closely but slidably fitted within the aforesaid annular plug 10 and its depending spout 12, the lower end of said tube 18 at all times projecting below the lower end of said spout, said tube carrying at its lower end a closure 19 having a peripheral stop flange 19a which prevents the tube from being moved up beyond the point at which said flange contacts the lower end of said tube, as shown in the right hand portion of Fig. 1. Said tube 18 is shown with a liquid supply port 20 which, when the tube is in its lowest position is still slightly above the cup bottom 13, and with an outlet vent 22 adjacent to its lower end. The body of liquid 23 within the cup, under air pressure control, is fed, as required, through said ports 20 and 22 to keep the body of liquid in the battery at a somewhat higher level 24 than the upper edges of the battery plates 25.

In order to afford the customary air vent means for the battery, each annular plug 10 is provided with a pair of (preferably diametrically opposite) angular vent passages 26.

Normally the cap 16 and its depending tube 18 will occupy the position shown in the left hand portion of Fig. 1 wherein the cap closes the upper end of the cup 14 and the lower end of said tube is submerged in the liquid body 24 to the extent shown. When, however, it is desired to refill said cup the cap 16 is elevated to or near, the position shown in the right hand portion of Fig. 1, bringing the aperture 22 into an obstructed position within the lower end portion of the spout 12 (not necessarily abutting the flange 19a against the lower end of the spout 12). Then the water supply hose will be inserted within the mouth of the cup and a sufficient amount of water is supplied to said cup to fill it to the desired extent. Thereupon the lid is depressed to its original position, again sealing in a fluid tight manner the mouth of the cup 14 so that an air pressure controlled supply of water will be fed into the battery from the ported lower end portion of the tube. Said end portion functions as a valve means to open and close the flow of liquid from the cup into the battery.

The side wall of the cup 14 should be sufficiently transparent to enable the user clearly to see the level of the contained water, a transparent plastic material desirably being used in its manufacture.

I claim:

1. In a device of the kind described, a combined battery filling cup and plug, said cup having a top closure consisting of a cap which is vertically movable in relation to the mouth of said cup to and from a closed position, a tube depending centrally from said cap, said tube extending slidably through the central portion of said plug, a spout depending centrally from said plug, said tube having a closed lower end, said tube being furnished with outlet means adjacent to its lower end positioned to be closed by said spout when said cap is raised to cup filling position, there being liquid supply ports leading through said tube for draining liquid from the cup into the tube.

2. The structure set forth in claim 1 and stop means carried by said tube and engageable with the lower end of said spout to limit the upward movement of said cap and tube.

3. In a device of the kind described, a battery filling cup having a lower end portion contoured and dimensioned to plug into and close the filler neck of a battery, a cap movable vertically to and from a closed relation to the mouth of said cup, a vertical conduit tube carried by and depending from the central portion of said cup, said tube at all times passing through and having a slidable fit within the aforesaid lower end portion of said cup, said tube being furnished adjacent to its otherwise closed lower end with a lateral outlet port positioned to be closed by said plug portion of said cup when the tube is elevated incident to raising said cap to open the mouth of the cup for filling, said tube having an inlet port positioned to admit into it the contents of said cup.

4. In a device of the kind described, a battery filling cup having a lower end portion contoured and dimensioned to plug into and close the filler neck of a battery, a cap movable vertically to and from a closed relation to the mouth of said cup, a vertical conduit tube carried by and depending from the central portion of said cup, said tube at all times passing through and having a slidable fit within the aforesaid lower end portion of said cup, and valve means carried by the lower end portion of said tube, said valve means opening when the tube is in its lowest position to conduct liquid from said cup to the battery and closing to retain the liquid within said cup when the tube is elevated by raising said cap to open the mouth of the cup for filling.

JACOB WARNER.

No references cited.